United States Patent
Blumenthal et al.

[11] Patent Number: 5,863,067
[45] Date of Patent: Jan. 26, 1999

[54] VEHICLE OCCUPANT PROTECTION APPARATUS

[75] Inventors: Jack L. Blumenthal, Los Angeles, Calif.; Ernst M. Faigle, Dryden, Mich.

[73] Assignee: TRW Vehicle Safety Systems Inc., Lyndhurst, Ohio

[21] Appl. No.: 760,837

[22] Filed: Dec. 5, 1996

[51] Int. Cl.⁶ .................................................. B60R 21/26
[52] U.S. Cl. ........................... 280/741; 280/736; 280/737
[58] Field of Search .................................... 280/741, 736, 280/737, 735, 734; 102/530, 531; 422/166

[56] References Cited

U.S. PATENT DOCUMENTS

| | | | |
|---|---|---|---|
| 3,655,217 | 4/1972 | Johnson | 280/728.1 |
| 3,966,226 | 6/1976 | Roth | 280/737 |
| 4,998,751 | 3/1991 | Paxton et al. | 280/741 |
| 5,022,674 | 6/1991 | Frantom et al. | 280/741 |
| 5,348,344 | 9/1994 | Blumenthal et al. | 280/737 |
| 5,398,966 | 3/1995 | Hock | 280/736 |
| 5,411,289 | 5/1995 | Smith et al. | 280/735 |
| 5,413,378 | 5/1995 | Steffens, Jr. et al. | 280/735 |
| 5,460,405 | 10/1995 | Faigle et al. | 280/735 |
| 5,470,104 | 11/1995 | Smith et al. | 280/737 |
| 5,494,312 | 2/1996 | Rink | 280/737 |
| 5,527,066 | 6/1996 | Svensson | 280/737 |
| 5,558,367 | 9/1996 | Cuevas | 280/737 |
| 5,564,743 | 10/1996 | Marchant | 280/741 |
| 5,566,976 | 10/1996 | Cuevas | 280/737 |
| 5,582,428 | 12/1996 | Buchanan et al. | 280/741 |
| 5,613,702 | 3/1997 | Goetz | 280/735 |

FOREIGN PATENT DOCUMENTS

| | | |
|---|---|---|
| 0742125 | 11/1996 | European Pat. Off. . |
| 50-112939 | 6/1975 | Japan . |

OTHER PUBLICATIONS

Research Disclosure "Inflator Assembly for an Infaltable Vehicle Occupant Protection Device Having Tailorable Output" Dec. 1995/827; pp. 827–829 (38048).

*Primary Examiner*—Christopher P. Ellis
*Attorney, Agent, or Firm*—Tarolli, Sundheim, Covell, Tummino & Szabo

[57] ABSTRACT

An apparatus for deploying an inflatable vehicle occupant protection device (12) includes a container (26) with a closed storage chamber (28) containing a combustible mixture of gases. The apparatus (10) further includes first and second initiators (18, 20). The first initiator (18), when actuated, first opens the storage chamber and then ignites the combustible mixture of gases. The second initiator (20), when actuated, also ignites the combustible mixture of gases. The first and second initiators (18, 20) are actuated in a selected one of a plurality of differing stages which correspond to a plurality of differing deployment conditions.

14 Claims, 3 Drawing Sheets

VEHICLE OCCUPANT PROTECTION APPARATUS

FIELD OF THE INVENTION

The present invention relates to an apparatus for deploying an inflatable vehicle occupant protection device.

BACKGROUND OF THE INVENTION

An inflatable vehicle occupant protection device, such as an air bag, is deployed upon the occurrence of a vehicle crash. The air bag is part of a vehicle occupant protection apparatus which further includes a crash sensor and an inflator. The crash sensor senses vehicle conditions that indicate the occurrence of a crash. When the crash sensor senses a crash-indicating condition of at least a predetermined threshold level, the inflator is actuated. The inflator then emits inflation fluid which inflates the air bag into the vehicle occupant compartment. When the air bag is deployed in this manner, it helps to protect an occupant of the vehicle from a forceful impact with parts of the vehicle as a result of the crash.

The manner in which the air bag affects movement of the vehicle occupant can be influenced by factors such as the force with which the occupant moves against the air bag and the pressure of the inflation fluid in the air bag. Those factors, in turn, can be influenced by vehicle conditions such as the severity of the crash, and/or by vehicle occupant conditions such as the size, weight and position of the occupant.

SUMMARY OF THE INVENTION

The present invention is an apparatus for deploying an inflatable vehicle occupant protection device. In accordance with the present invention, the apparatus comprises a container, a first initiator, and a second initiator.

The container has a closed storage chamber containing a combustible mixture of gases. The first initiator, when actuated, first opens the storage chamber and then ignites the combustible mixture of gases. The second initiator, when actuated, also ignites the combustible mixture of gases.

The apparatus further comprises means for actuating the first and second initiators in a selected one of a plurality of differing stages. The differing stages correspond to a plurality of differing deployment conditions.

An apparatus constructed in accordance with the present invention enables the combustible mixture of gases to inflate a vehicle occupant protection device in a manner that is tailored to a particular deployment condition, such as a vehicle or vehicle occupant condition, that exists at the time of a crash.

BRIEF DESCRIPTION OF THE INVENTION

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS

Figure 1:
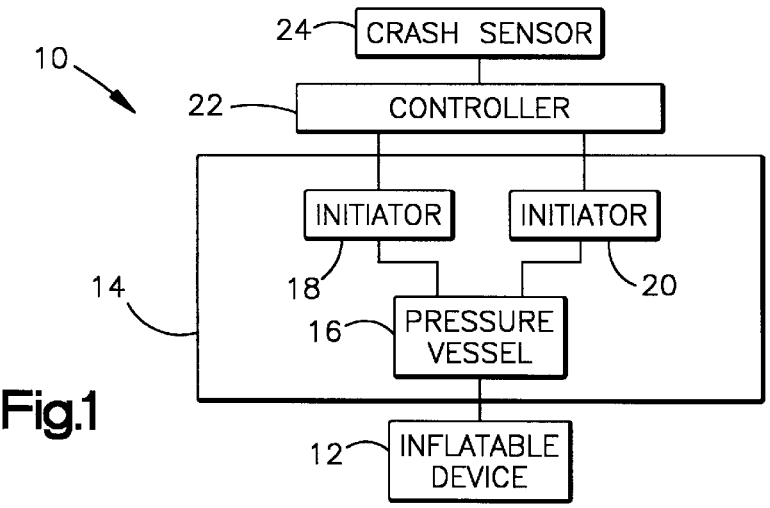
FIG. 1 is a schematic view of a vehicle occupant protection apparatus comprising a first embodiment of the present invention.

A vehicle occupant protection apparatus 10 comprising a first embodiment of the present invention is shown schematically in FIG. 1. The apparatus 10 includes an inflatable vehicle occupant protection device 12. In the first embodiment of the present invention, the protection device 12 is an air bag. Other inflatable vehicle occupant protection devices that can be used in accordance with the present invention include, for example, inflatable seat belts, inflatable knee bolsters, inflatable head liners, and knee bolsters operated by inflatable air bags. The apparatus 10 further includes an inflator 14 which comprises a source of inflation fluid for inflating the air bag 12. When the air bag 12 is inflated, it extends into a vehicle occupant compartment (not shown) to help protect a vehicle occupant from a forceful impact with parts of the vehicle as a result of a crash.

The inflator 14 includes a pressure vessel 16 which comprises a source of inflation fluid for inflating the air bag 12. Specifically, the pressure vessel 16 stores a pressurized, combustible mixture of gases including a primary gas and a fuel gas. The primary gas comprises the majority of the inflation fluid that inflates the air bag 12. The fuel gas, when ignited, heats the primary gas.

The inflator 14 further includes first and second initiators 18 and 20 which are actuatable separately from each other. The first initiator 18, when actuated, opens the pressure vessel 16 and ignites the fuel gas in the combustible mixture of gases. The second initiator 20, when actuated, also ignites the fuel gas in the combustible mixture of gases. A controller 22 actuates the initiators 18 and 20 in response to a deployment signal received from a crash sensor 24.

The combustible mixture of gases may have any suitable composition known in the art, but preferably has a composition in accordance with the invention set forth in U.S. Pat. No. 5,348,344, to Blumenthal et al., entitled APPARATUS FOR INFLATING A VEHICLE OCCUPANT RESTRAINT USING A MIXTURE OF GASES, and assigned to TRW Vehicle Safety Systems Inc. Accordingly, the primary gas preferably includes an inert gas for inflating the air bag and an oxidizer gas for supporting combustion of the fuel gas. The primary gas may include air, an inert gas, or a mixture of air and an inert gas. The inert gas may be nitrogen, argon or a mixture of nitrogen and argon. For example, the primary gas may be air, with the oxidizer gas being the oxygen in the air. The fuel gas may be hydrogen, methane, or a mixture of hydrogen and methane. Preferably, the fuel gas is hydrogen. A preferred composition of the mixture of gases is about 12% by volume hydrogen and about 88% by volume air. Although the storage pressure may vary, it is preferably within the range of approximately 1,500 psi to approximately 5,000 psig., and is most preferably approximately 2,500 psig.

The crash sensor 24 is a known device which senses a vehicle condition that indicates the occurrence of a crash. If the vehicle condition sensed by the crash sensor 24 is at or above a predetermined threshold level, it indicates the occurrence of a crash having at least a predetermined threshold level of severity. The threshold level of crash severity is a level at which inflation of the air bag 12 is desired for protection of a vehicle occupant. The crash sensor 24 then provides the controller 22 with a deployment signal.

The vehicle condition sensed by the crash sensor 24 preferably comprises sudden vehicle deceleration that is caused by a collision. The magnitude and duration of the deceleration are measured by the crash sensor 24. If the magnitude and duration of the deceleration meet or exceed predetermined threshold levels, they indicate the occurrence of a crash that meets or exceeds the predetermined threshold level of crash severity. A deployment signal is then transmitted to the controller 24 to indicate the occurrence of such a crash. Additionally, the deployment signal has a value which indicates the degree to which the magnitude and duration of the vehicle deceleration exceed the corresponding threshold levels. The deployment signal thus indicates both the occurrence and severity of a crash for which the air bag 12 is to be inflated.

The controller 22 preferably comprises a microprocessor of known construction. As described more fully below, the controller 22 actuates the first initiator 18 upon receiving the deployment signal from the crash sensor 24. The controller 22 actuates the second initiator 20 at a time which is determined with reference to the value of the deployment signal received from the crash sensor 24. Actuation of the first and second initiators 18 and 20, and resulting ignition of the fuel gas in the pressure vessel 16, is thus timed with reference to both the occurrence and the severity of the crash. As a result, the inflation fluid flows from the pressure vessel 16 to the air bag 12 at flow rates that are correlated to the severity of the crash so that the air bag 12 is deployed accordingly.

The inflator 14, including the pressure vessel 16 and the first and second initiators 18 and 20, may have any suitable structure defined by parts known in the art. In the first embodiment of the present invention, the inflator 14 has the structure shown by way of example in FIG. 2. The pressure vessel 16 comprises an elongated cylindrical container 26 defining an elongated cylindrical storage chamber 28. The container 26 has a tubular body wall 30 and a pair of circular opposite end walls 32 and 34, each of which is centered on a longitudinal axis 35.

The first end wall 32 of the container 26 has an axially projecting rim portion 36. An annular end surface 38 of the rim portion 36 abuts an annular end surface 40 of the body wall 30. A first friction weld 42 fixes and seals the first end wall 32 and the body wall 30 together at their abutting end surfaces 38 and 40. The second end wall 34 similarly has an axially projecting rim portion 46 with an annular end surface 48 abutting an annular end surface 50 of the body wall 30. A second friction weld 52 fixes and seals the second end wall 34 and the body wall 30 together at their abutting end surfaces 48 and 50. The container walls 30, 32 and 34 may be formed of steel, aluminum, or any suitable alloy known in the art. The friction welds 42 and 52 preferably are inertia welds. However, other types of friction welds, such as conventional friction welds or flywheel friction welds, can be used as alternatives.

A tubular central section 56 of the first end wall 32 has an inner end portion 58 and an outer end portion 60. The inner end portion 58 defines a circular outlet opening 62 centered on the axis 35. A closure wall in the form of a burst disk 64 extends fully across the outlet opening 62, and is fixed and sealed to the tubular wall section 56 by a circumferentially extending weld 66. The burst disk 64 thus closes the storage chamber 28 at the outlet opening 62. A plurality of radially extending score lines 68 delineate petal-shaped sections of the burst disk 64 which, as known in the art, separate and deflect outwardly from the storage chamber 28 upon rupturing of the burst disk 64.

The outer end portion 60 of the tubular wall section 56 has a circumferentially extending array of outlet openings 70 for directing inflation fluid to flow from the inflator 14 toward the air bag 12 (FIG. 1). The outer end portion 60 further has a rim wall 72 which is crimped radially inward against the first initiator 18 to support the first initiator 18 within the tubular wall section 56 in a position centered on the axis 35.

The second initiator 20 preferably is a particular type of electrically actuatable igniter which is known as a squib. The second initiator 20 thus has a cylindrical casing 74 containing a small charge of pyrotechnic material. The casing 74 fits closely within a cylindrical aperture 76 extending axially through the second end wall 34. A TIG weld 78 fixes and seals the casing 74 and the second end wall 34 together so that the second initiator 20 closes the storage chamber 28 at the aperture 76.

Figure 2:
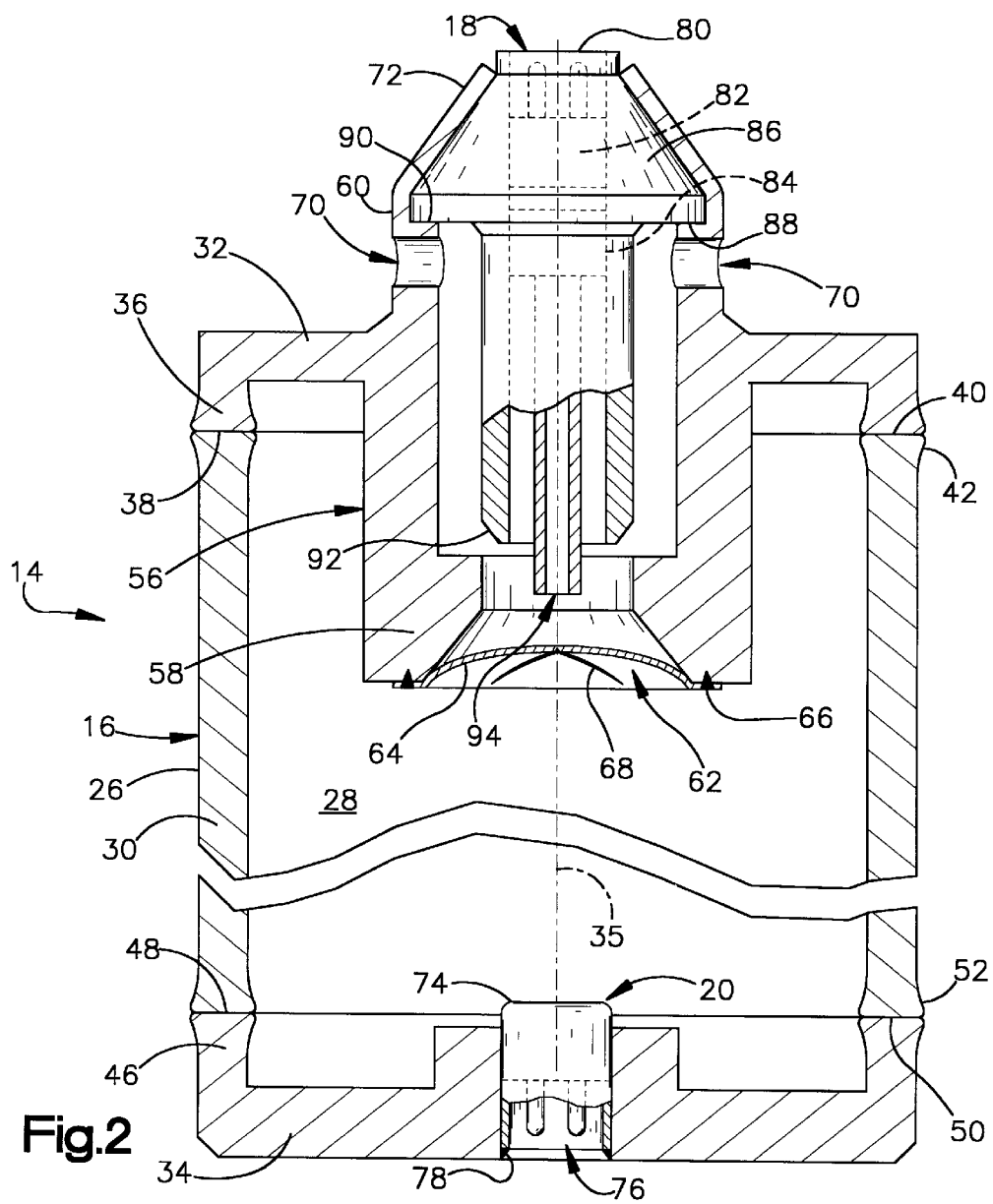
FIG. 2 is a side view, partly in section, of parts of the apparatus of FIG. 1.

As further shown in FIG. 2, the first initiator 18 comprises a housing 80 containing a squib 82 and a piston 84. A frustoconical portion 86 of the housing 80 has an annular shoulder surface 88 abutting an annular shoulder surface 90 of the tubular wall section 50. The crimped rim wall 72 holds the abutting surfaces 88 and 90 together firmly enough to block the passage of inflation fluid outward between the first initiator 18 and the tubular wall section 56. A cylindrical portion 92 of the housing 80 projects axially from the frustoconical portion 86 toward the burst disk 64. The cylindrical portion 92 supports the piston 84 for sliding movement along the axis 35.

The squib 82 in the first initiator 18 also contains a small charge of pyrotechnic material. When the first initiator 18 is actuated, the pyrotechnic material in the squib 82 is ignited and produces combustion products including heat and hot particles. The housing 80 supports the squib 82 in a position from which it spews the combustion products toward and against the piston 84. The combustion products then develop a thrust which propels the piston 84 along the axis 35 forcefully against and through the burst disk 64. When the piston 84 penetrates the burst disk 64 in this manner, the burst disk 64 ruptures along the score lines 68 under the influence of the fluid pressure in the storage chamber 28. The inflation fluid then begins to flow outward from the storage chamber 28 through the outlet opening 62.

Additionally, the combustion products emitted from the squib 82 are conveyed into the storage chamber 28 through a passage 94 in the piston 84. The combustion products then ignite the fuel gas in the combustible mixture of gases. The temperature and fluid pressure in the storage chamber 28, and hence the flow rate of the inflation fluid emerging from the storage chamber 28, are increased accordingly.

When the second initiator 20 is actuated, it spews combustion products directly into the storage chamber 28. Those combustion products also ignite the fuel gas and cause corresponding increases in the temperature, pressure and outlet flow rate. Accordingly, these parameters can be controlled in accordance with the present invention by controlling the timing at which the first and second initiators 18 and 20 are actuated.

More specifically, the controller 22 (FIG. 1) actuates the first and second initiators 18 and 20 in a selected one of a plurality of differing stages in response to the crash severity indicated by the deployment signal received from the crash sensor 24. The differing stages of actuation include a first stage in which only the first initiator 18 is actuated, a second stage in which the first and second initiators 18 and 20 are actuated sequentially, and a third stage in which the first and second initiators 18 and 20 are actuated simultaneously.

For example, if the deployment signal indicates that the vehicle is experiencing a crash of a relatively low severity, only the first initiator 18 will be actuated. If the deployment signal indicates that the vehicle is experiencing a crash of an intermediate level of severity, the first initiator 18 will be actuated, and the second initiator 20 will be actuated after the lapse of a delay time which is determined by the controller 22 with reference to the intermediate level of crash severity. The controller 22 may determine the delay time by selecting from a look-up table based on empirically derived values of crash severity. The controller 22 may alternatively determine the delay time as the result of a computation based on a predetermined functional relationship between crash severity and delay time. If the deployment signal indicates the occurrence of a crash having a relatively high level of severity, the controller 22 will actuate the first and second initiators 18 and 20 simultaneously, i.e., the delay time will be zero.

Figure 3:
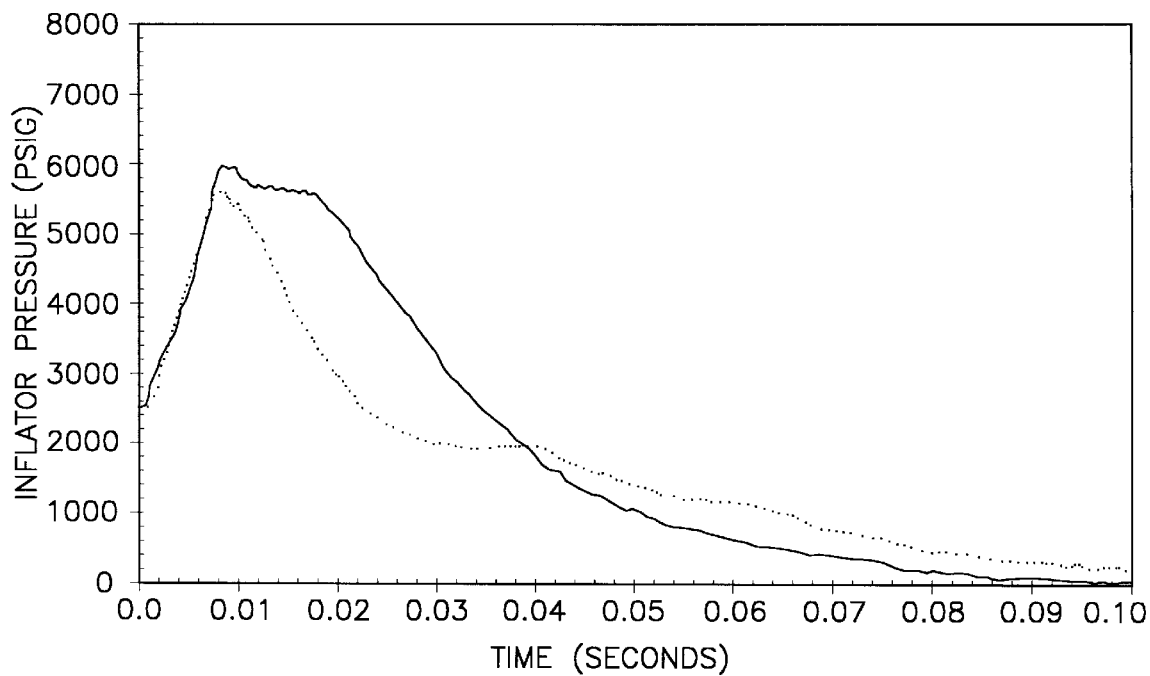
FIGS. 3 and 4 are graphs showing performance characteristics of the apparatus of FIG. 1.
Figure 4:
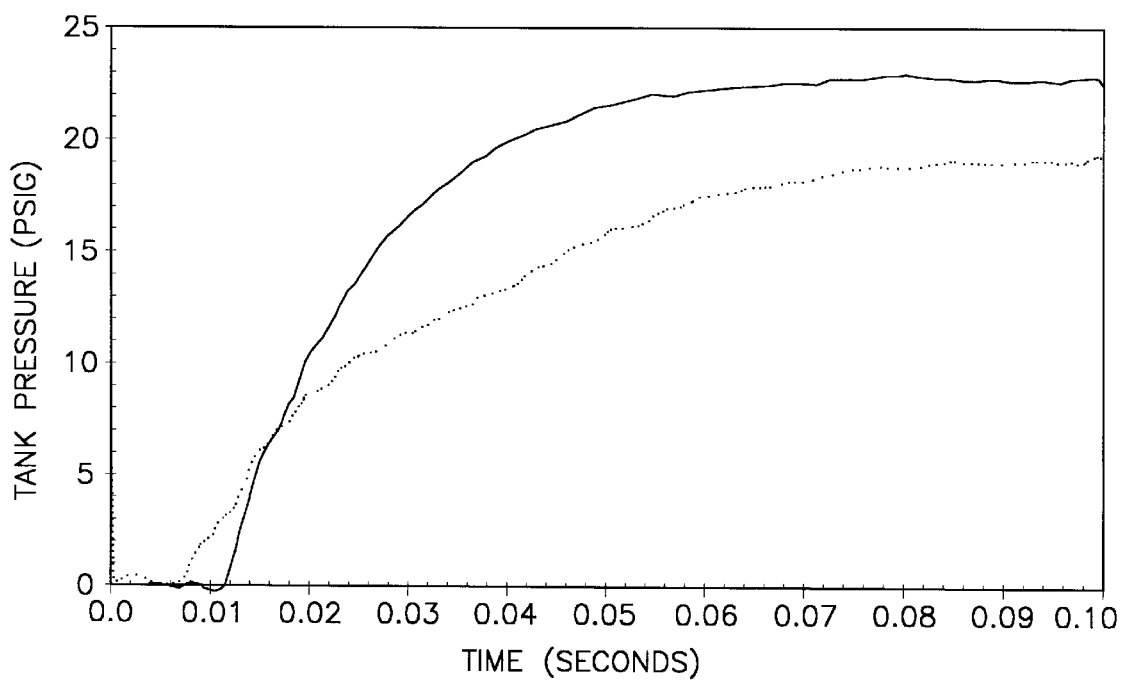

FIGS. 3 and 4 are graphs showing performance characteristics of a test apparatus (not shown) which is substantially similar to the vehicle occupant protection apparatus 10 of FIG. 1. The test apparatus includes a test inflator like the inflator 14. The fluid pressure in the storage chamber of the test inflator is indicated on the vertical axis of FIG. 3. Instead of an inflatable device like the air bag 12, the test apparatus includes a tank in which the fluid pressure can be measured. The fluid pressure in the tank is indicated on the vertical axis of FIG. 4. The horizontal axes of FIGS. 3 and 4 have the same time scale.

The curve shown as a dashed line in FIG. 3 represents the fluid pressure in the test inflator resulting from actuation of only the first of two initiators like the initiators 18 and 20. This corresponds to the first stage of actuation described above. Actuation of the first initiator is thus shown to increase the fluid pressure in the test inflator to elevated levels that are greater than the storage pressure of approximately 2,500 psig. Such elevated pressure levels result in outlet flow rates that are likewise greater than the outlet flow rates that would otherwise occur. The curve shown as a dashed line in FIG. 4 represents the resulting fluid pressure in the tank.

The curve shown as a solid line in FIG. 3 represents the fluid pressure in the test inflator resulting from actuation of the first initiator, and further resulting from subsequent actuation of the second initiator ten milliseconds later. This corresponds to the second stage of actuation described above. Actuation of the second initiator is thus shown to maintain the fluid pressure at levels above the storage pressure for a longer time, as compared with actuation of only the first initiator. The curve shown as a solid line in FIG. 4 represents the resulting fluid pressure in the tank. That curve shows that the fluid pressure in the tank is elevated more rapidly, and reaches higher levels, when the initiators in the test apparatus are actuated in the second stage. This results from greater outlet flow rates that are provided by the greater pressure levels attained in the test inflator in the second stage. The fluid pressure in the air bag 12 or other inflatable device will likewise increase more rapidly, and will reach higher levels, when the initiators 18 and 20 of FIGS. 1 and 2 are actuated in the second stage. A still more rapid increase in fluid pressure, and even higher fluid pressure levels, will result from actuation in the third stage described above.

Figure 5:
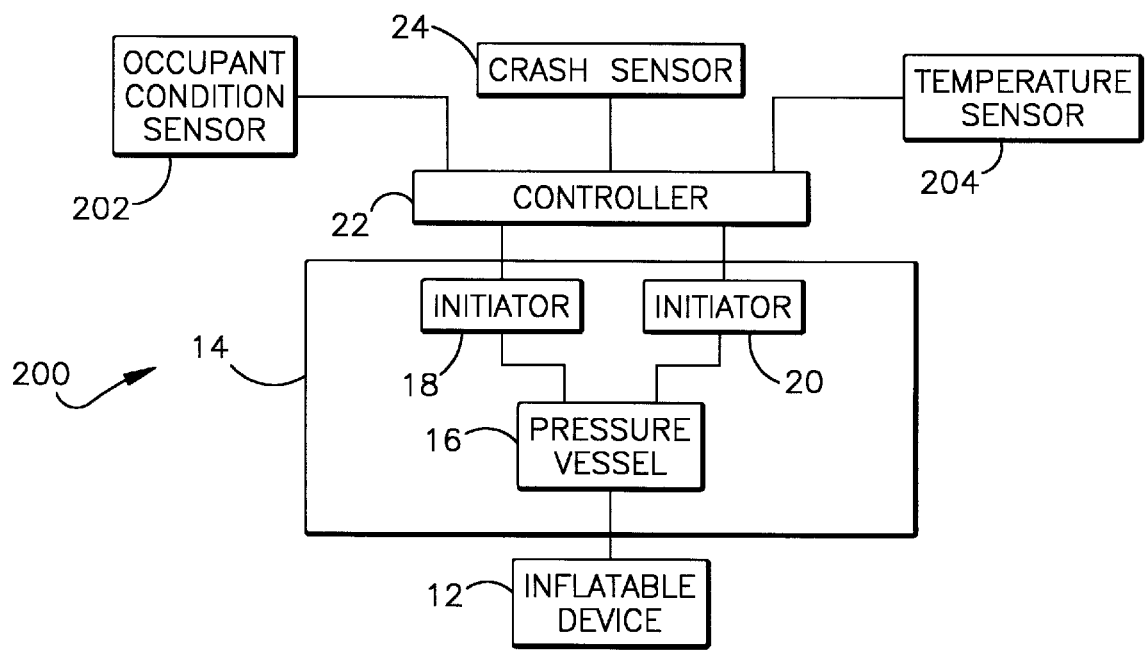
FIG. 5 is a schematic view of a vehicle occupant protection apparatus comprising a second embodiment of the present invention.

A vehicle occupant protection apparatus 200 comprising a second embodiment of the present invention is shown schematically in FIG. 5. The apparatus 200 includes an occupant condition sensor 202 and a temperature sensor 204 in addition to the crash sensor 24 of FIG. 1. The apparatus 200 is otherwise the same as the apparatus 10, as indicated by the use of the same reference numbers in FIGS. 5 and 1.

The occupant condition sensor 202 may comprise any known device that provides a signal indicating a vehicle occupant condition such as, for example, an occupant's size, weight and/or position. Other vehicle occupant conditions include the occupant's presence in the vehicle and the occupant's use of a seat belt, as indicated by a seat belt buckle switch or the like. In each case, the sensor 202 provides the controller 22 with an additional deployment signal that the controller 22 uses, along with the deployment signal received from the crash sensor 24, to select a stage of actuation for the first and second initiators 18 and 20.

The temperature sensor 204 provides a deployment signal indicating the ambient temperature at the inflator 14. Since the ambient temperature at the inflator 14 can affect the pressure of the inflation fluid stored in the storage chamber 28, it can likewise affect the flow rate at which the inflation fluid exits the storage chamber 28 upon actuation of the initiators 18 and 20. The controller 22 in the second embodiment of the present invention thus selects a stage of actuation for the first and second initiators 18 and 20 with reference to the occurrence and severity of a vehicle crash, and with further reference to a condition of a vehicle occupant and/or the ambient temperature at the inflator 14.

From the above description of the invention, those skilled in the art will perceive improvements, changes and modifications. For example, the deployment conditions sensed by the sensors 24, 202 and 204 are described by way of example only. Other vehicle or vehicle occupant conditions also could be used as deployment conditions for selecting an actuation stage for a plurality of initiators in accordance with the present invention. Such improvements, changes and modifications within the skill of the art are intended to be covered by the appended claims.

Having described the invention, the following is claimed:

1. Apparatus for deploying an inflatable vehicle occupant protection device, said apparatus comprising:

a container having a closed storage chamber containing a combustible mixture of gases;

a first initiator which, when actuated, first opens said storage chamber and then ignites said combustible mixture of gases;

a second initiator which, when actuated, ignites said combustible mixture of gases;

sensor means for sensing a vehicle crash and providing a signal indicative of crash severity; and means for actuating said first and second initiators in a selected one of a plurality of differing stages which correspond to a plurality of differing deployment conditions dependent upon crash severity.

2. Apparatus as defined in claim 1 wherein said differing stages include a stage in which said first and second initiators are actuated sequentially, and further include a stage in which said first and second initiators are actuated simultaneously.

3. Apparatus as defined in claim 1 wherein said differing stages include a stage in which only said first initiator is actuated.

4. Apparatus as defined in claim 1 wherein said deployment conditions comprise a plurality of differing vehicle conditions.

5. Apparatus as defined in claim 4 wherein said vehicle conditions include a temperature condition.

6. Apparatus as defined in claim 1 wherein said deployment conditions comprise a plurality of differing vehicle occupant conditions.

7. Apparatus as defined in claim 2 wherein said means for actuating said first and second initiators including a controller controls the sequential actuation of said first and second initiators and determines the time between actuation of said first and second initiators.

8. Apparatus for deploying an inflatable vehicle occupant protection device, said apparatus comprising:

a container having a storage chamber containing a combustible mixture of gases under pressure;

first initiator means for initiating an outlet flow of said mixture from said storage chamber at a first time, said first initiator means igniting said mixture to increase said pressure and thereby to increase said outlet flow;

second initiator means for maintaining said pressure and said outlet flow at increased levels by igniting said mixture at a second time which is not earlier than said first time;

sensor means for sensing a vehicle crash and providing a signal dependent upon crash severity; and means for actuating said first and second initiator means in a selected one of a plurality of differing stages which correspond to a plurality of differing deployment conditions dependent upon crash severity.

9. Apparatus as defined in claim 8 wherein said stages include a stage in which said second time is later than said first time.

10. Apparatus as defined in claim 8 wherein said deployment conditions comprise a plurality of differing vehicle conditions.

11. Apparatus as defined in claim 10 wherein said vehicle conditions include a temperature condition.

12. Apparatus as defined in claim 8 wherein said deployment conditions comprise a plurality of differing vehicle occupant conditions.

13. Apparatus as defined in claim 8 wherein said combustible mixture of gases is stored in said storage chamber.

14. Apparatus as defined in claim 8 wherein said means for actuating said first and second initiators including a controller controls the sequential actuation of said first and second initiators and determines the time between actuation of said first and second initiators.

* * * * *